US008765863B2

(12) United States Patent
Bergman et al.

(10) Patent No.: US 8,765,863 B2
(45) Date of Patent: Jul. 1, 2014

(54) TRIETHYLAMINE FUNCTIONALIZED ELASTOMER IN BARRIER APPLICATIONS

(75) Inventors: Brian Bergman, Clermont-Ferrand (FR); Anthony Jay Dias, Houston, TX (US); Caiguo Gong, Shanghai (CN); Thomas C. Hodge, Simpsonville, SC (US); David John Lohse, Bridgewater, NJ (US); Weiqing Weng, Houston, TX (US)

(73) Assignees: ExxonMobil Chemical Patents Inc., Baytown, TX (US); Michelin Recherche et Technique S.A., Grange-Paccot (CH)

( * ) Notice: Subject to any disclaimer, the term of this patent is extended or adjusted under 35 U.S.C. 154(b) by 0 days.

(21) Appl. No.: 12/680,885

(22) PCT Filed: Nov. 14, 2007

(86) PCT No.: PCT/US2007/084689
§ 371 (c)(1),
(2), (4) Date: Mar. 30, 2010

(87) PCT Pub. No.: WO2009/064295
PCT Pub. Date: May 22, 2009

(65) Prior Publication Data
US 2010/0210779 A1      Aug. 19, 2010

(51) Int. Cl.
| C08K 3/34 | (2006.01) |
| C08L 39/00 | (2006.01) |
| C08F 220/00 | (2006.01) |
| C08L 27/00 | (2006.01) |
| C08L 9/00 | (2006.01) |
| C08F 8/32 | (2006.01) |
| C08K 3/00 | (2006.01) |

(52) U.S. Cl.
CPC . *C08L 9/00* (2013.01); *C08K 3/346* (2013.01); *C08K 3/0033* (2013.01); *C08F 8/32* (2013.01)

USPC ............................ 524/445; 526/293; 526/310

(58) Field of Classification Search
USPC ................................... 526/293; 524/445, 451
See application file for complete search history.

(56) References Cited

U.S. PATENT DOCUMENTS

| 3,516,959 A | 6/1970 | Jonas |
| 3,898,253 A | 8/1975 | Buckler et al. |

(Continued)

FOREIGN PATENT DOCUMENTS

| WO | 94/22680 | 10/1994 |
| WO | 01/85831 | 11/2001 |

(Continued)

OTHER PUBLICATIONS

Parent (Synthesis and Characterization of Isobutylene-Based Ammonium and Phosphonium Bromide Ionomers. Macromolecules, 2004, 37, 7477-7488).*

*Primary Examiner* — Brieann R Fink
*Assistant Examiner* — Milton I Cano
(74) *Attorney, Agent, or Firm* — Daniel N. Lundeen; Lundeen & Lundeen PLLC

(57) ABSTRACT

A halogenated elastomer partially functionalized with triethylamine, in a mixture with fiiier and a cure package, suitable for use as an air barrier in an innertube or tire innerliner, is disclosed. The halogenated elastomer can be a polymer comprising $C_4$ to $C_7$ isoolefm derived units, para-alkylstyrene derived units, para-(haloalkylstyrene) derived units, and para-(triethylammoniumalkylstyrene) derived units. The Mooney viscosity of the elastomer can be controlled by the degree of triethylamine functionalization. Also disclosed is a method for making an article using the tri ethy iamine-functionalized elastomer.

23 Claims, 2 Drawing Sheets

(56) References Cited

U.S. PATENT DOCUMENTS

| | | | |
|---|---|---|---|
| 4,074,035 A | 2/1978 | Powers et al. | |
| 4,093,567 A * | 6/1978 | Hurwitz et al. | 521/32 |
| 4,311,799 A * | 1/1982 | Miyake et al. | 521/31 |
| 5,162,445 A | 11/1992 | Powers et al. | |
| 5,333,662 A | 8/1994 | Costemalle et al. | |
| 5,576,372 A | 11/1996 | Kresge et al. | |
| 5,576,373 A | 11/1996 | Kresge et al. | |
| 5,633,321 A | 5/1997 | Arjunan | |
| 5,665,183 A | 9/1997 | Kresge et al. | |
| 5,807,629 A * | 9/1998 | Elspass et al. | 428/323 |
| 5,883,173 A | 3/1999 | Elspass et al. | |
| 5,936,023 A | 8/1999 | Kato et al. | |
| 5,973,053 A | 10/1999 | Usuki et al. | |
| 6,034,164 A | 3/2000 | Elspass et al. | |
| 6,036,765 A | 3/2000 | Farrow et al. | |
| 6,060,549 A | 5/2000 | Li et al. | |
| 6,060,563 A * | 5/2000 | Peiffer et al. | 525/213 |
| 6,103,817 A | 8/2000 | Usuki et al. | |
| 6,121,361 A | 9/2000 | Usuki et al. | |
| 6,147,178 A * | 11/2000 | Nakamura et al. | 526/340 |
| 6,552,108 B1 * | 4/2003 | Wang et al. | 524/251 |
| 6,825,281 B2 * | 11/2004 | Agarwal et al. | 525/241 |
| 7,576,155 B2 | 8/2009 | Wang et al. | |
| 7,915,333 B2 * | 3/2011 | Resendes et al. | 524/445 |
| 7,923,491 B2 * | 4/2011 | Weng et al. | 524/13 |
| 2005/0027057 A1 * | 2/2005 | Dias et al. | 524/445 |
| 2005/0027058 A1 | 2/2005 | Dias et al. | |
| 2005/0032937 A1 | 2/2005 | Tsou et al. | |
| 2007/0015853 A1 * | 1/2007 | Weng et al. | 523/333 |
| 2008/0058472 A1 * | 3/2008 | Soeda et al. | 525/190 |
| 2009/0182095 A1 * | 7/2009 | Resendes et al. | 525/332.3 |
| 2010/0010140 A1 * | 1/2010 | Resendes et al. | 524/445 |

FOREIGN PATENT DOCUMENTS

| | | |
|---|---|---|
| WO | 02/100935 | 12/2002 |
| WO | 02/100936 | 12/2002 |

\* cited by examiner

TRIETHYLAMINE FUNCTIONALIZED ELASTOMER IN BARRIER APPLICATIONS

FIELD OF THE INVENTION

This invention relates to low-permeability elastomers useful in air barrier applications, and particularly to compositions, methods and articles based on triethylamine-functionalized isobutylene polymers.

BACKGROUND OF THE INVENTION

Rubbery copolymers containing a majority of isobutylene units are well known for their low gas permeability, unique damping properties, and low surface energy that make them particularly desired in applications such as inner tubes and tire innerliners. For better compatibility or co-curability with other elastomer components in the applications, an unsaturated comonomer and/or a comonomer containing reactive functionality has been used. Among the isobutylene polymers, the isobutylene/para-methylstyrene copolymers (IPMS) are of particular interest. The para-methylstyrene (PMS) derived units in the polymers can be partially brominated to give an isobutylene/PMS/BrPMS terpolymer (BIMS). The BIMS can be further functionalized via the reactive benzylic bromine for conversion to a variety of functionalized isobutylene polymers, as described in U.S. Pat. No. 5,162,445. Another advantage of IPMS copolymers and BIMS terpolymers is their excellent resistance to ozone and aging due to the completely saturated backbones.

The tire industry has a desire to enhance the barrier property of elastomers used in inner tubes and innerliners. For example, elastomer nanocomposites have been developed. Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and U.S. Pat. No. 5,576,372. Common types of inorganic particles used in nanocomposites are phyllosilicates, an inorganic substance from the general class of so called "nanoclays." Ideally, intercalation should take place in the nanocomposite, wherein the polymer inserts into the space or gallery between the clay surfaces. Ultimately, it is desirable to have exfoliation, wherein the polymer is fully dispersed with the individual nanometer-size clay platelets.

Unfortunately the incompatibility between the hydrophobic isobutylene elastomer and hydrophilic inorganic clays has made it very difficult to achieve a good clay dispersion or exfoliation in the elastomer. One approach has been the use of organically modified montmorillonite clays. Organoclays are typically produced through ion-exchange reactions that replace sodium ions that exist on the surface of sodium montmorillonite with organic molecules, such as alkyl or aryl ammonium compounds known in the industry as swelling or exfoliating agents. See, e.g., U.S. Pat. No. 5,807,629, WO 02/100935, and WO 02/100936. Other background references include U.S. Pat. Nos. 3,516,959, 3,898,253, 5,333,662, 5,576,373, 5,633,321, 5,665,183, 5,807,629, 5,936,023, 6,036,765, 6,121,361, 6,552,108, WO 94/22680, WO 01/85831, and WO 04/058874.

Functionalization of the BIMS polymers for use in nanocomposites has also been shown to provide a better interaction between the functionality on the polymer and clay surface, which can lead to a higher degree of clay dispersion and exfoliation. This, in turn, can provide the nanocomposite with an even better barrier property. The preferred functionalities for permeability improvements in BIMS polymers have been ammonium (—NR), hydroxyl (—OH), ester (—OOR), and ether (—OR).

Unfortunately, when ammonium functionality is incorporated into a polymer and/or a nanocomposite with clay, the viscosity of the polymer can increase significantly due to the ionomeric associations of the functional groups in the polymer backbone. A low viscosity is needed to facilitate processing of the elastomer in conventional rubber compounding and tire building equipment. One way to try to attain a low viscosity has been to include a higher alkyl tail in the functional group, which can inhibit the ionomeric interactions. For example, published applications US 2005/0027057, US 2005/0027058 and US 2005/0032937 disclose treatment of BIMS polymers with tertiary amines preferably having a long chain alkyl substituent.

The tire industry has a continuing need for elastomers and nanocomposites that can be used in air barrier applications, having both an improved barrier property and a controllable processability.

SUMMARY OF THE INVENTION

We discovered that partial triethylamine (TEA) functionalization of halogenated elastomers such as BIMS polymers can offer several advantages in elastomer and especially nanocomposite applications over other functional polymers. While the TEA-functionalized BIMS promotes dispersion of the nanoclay and improves the barrier property, the Mooney viscosity of triethylamine-functional polymer, and thus its processability, can be readily adjusted by controlling the amount of functionality in the polymer.

Typically, when ammonium functionality had been incorporated into a polymer, the viscosity of the polymer would increase significantly due to the ionomeric associations of the functional groups in the polymer backbone. Surprisingly, the presence of three ethyl groups in the partially functionalized polymer provides shielding of the ionic interactions between the functional groups to prevent a severe rise in viscosity. The three ethyl groups in the TEA-functional polymer provide just the right amount of shielding of the ionic interactions between the functional groups to prevent a severe rise in viscosity. Thus, the use of TEA can give the functional polymer not only enough functionality to interact with clay for a good barrier property, but, more importantly, also leave it with good processability that is desired in rubber compounding and tire manufacturing.

In one embodiment, the present invention can provide a vulcanizable rubber composition, comprising an elastomer, a filler, and a cure package. The elastomer can comprise $C_4$ to $C_7$ isoolefin derived units para-alkylstyrene derived units, para-(haloalkylstyrene) derived units and para-(triethylammoniumalkylstyrene) derived units having the triethylammoniumalkyl group pendant to the elastomer E according to the following formula:

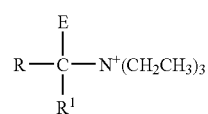

wherein R and $R^1$ are the same or different and are one of hydrogen, $C_1$ to $C_7$ alkyls, and primary and secondary $C_1$ to $C_7$ alkyl halides, preferably hydrogen. In an embodiment, the elastomer can comprise halogenated poly(isobutylene-co-p- methylstyrene) wherein a portion of the benzylic halogen groups are triethylamine-functionalized.

In embodiments, the elastomer can comprise a molar ratio of triethylamine functionality to benzylic halogen from 1:100 to 1:1, or from 1:20 to 1:2. From 1 to 60 mole percent of the alkylstyrene groups can be halogenated or triethylamine-functionalized. The elastomer can comprise in various embodiments from 0.5 to 20 weight percent methylstyrene, from 0.1 to 3 mole percent halomethylstyrene, and/or from 0.05 to 1 mole percent triethylammoniumalkylstyrene. In an embodiment, the para-(triethylammoniumalkylstyrene) derived units can be present at from 0.01 to 0.5 percent by weight of the elastomer. In another embodiment, the elastomer can further comprise multiolefin derived units, halogenated multiolefin derived units, or the like, or a combination thereof. In another embodiment, the elastomer can have a Mooney viscosity (ML 1+8, 125° C.) from 30 to 120.

In an embodiment, the vulcanizable rubber composition can also include a secondary rubber selected from the group consisting of natural rubber, polybutadiene rubber, nitrile rubber, silicon rubber, polyisoprene rubber, poly(styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber, poly(isobutylene-co-p-methylstyrene), halogenated poly(isobutylene-co-p-methylstyrene), and the like, including mixtures thereof.

In embodiments, the filler can be selected from carbon black, modified carbon black, silica, precipitated silica, clay, nanoclay and the like, including mixtures thereof. In one embodiment, the filler comprises nanoclay, which can be exfoliated. The exfoliating agent can be selected from the group consisting of ammonium ion, alkylamines, alkylammonium ion (primary, secondary, tertiary and quaternary), phosphonium or sulfonium derivatives of aliphatic, aromatic and arylaliphatic amines, phosphines, sulfides and the like, and including mixtures thereof. In an embodiment, the composition can include from 1 to 100 phr of the nanoclay.

In one embodiment, the curing agents can comprise zinc, zinc stearate, fatty acids, sulfur, or the like, or a mixture thereof.

In another aspect, the invention can provide an air barrier structure such as an inner tube or tire innerliner. In an embodiment, the vulcanizable rubber composition described above can be formed into the air barrier structure, and can be cured in the form of the air barrier structure.

A further aspect of the invention can provide a method of preparing an elastomeric article. The method can include the steps of: melt processing a mixture of the partially ionomerized, partially halogenated elastomer, the filler and the cure package described above; forming the melt processed mixture into a green article, and curing the formed article. In one embodiment, the article can be an inner tube, and in another embodiment, a tire innerliner formed from the elastomer mixture.

In one embodiment, the method can include adjusting an overall content of the para-(triethylammoniumalkylstyrene) in the elastomer to control a viscosity of the mixture in the melt processing step.

DETAILED DESCRIPTION OF THE INVENTION

Figure 1:
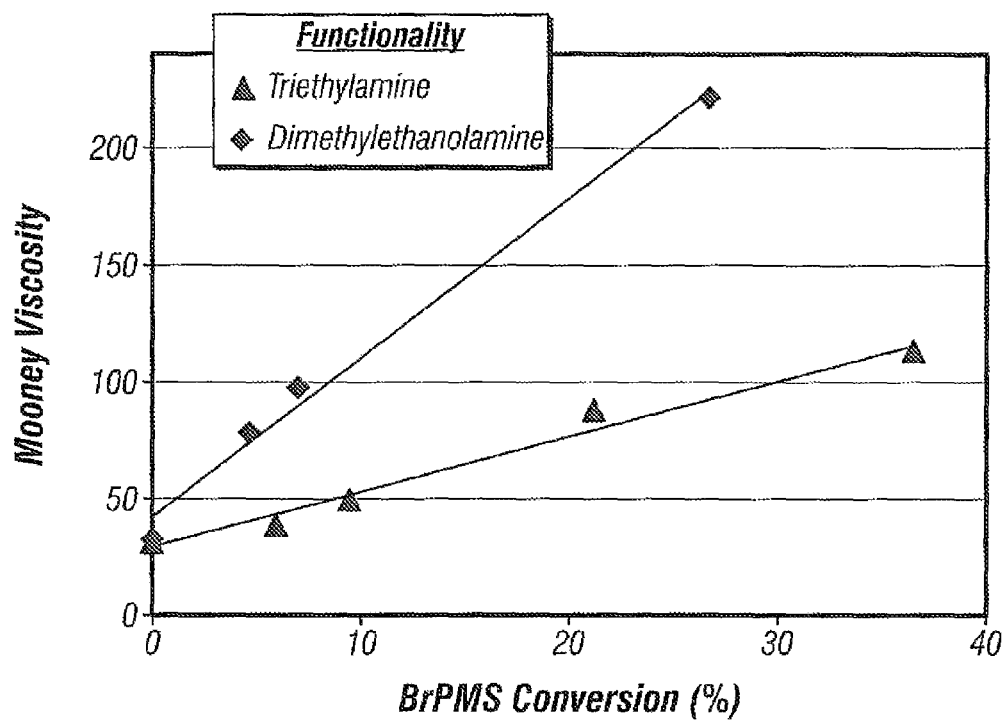
FIG. 1 graphically illustrates the controllability of viscosity of a halogenated isoolefin copolymer (BIMS) partially functionalized with triethylamine in varying proportions according to embodiments of the present invention, in comparison with the same copolymer functionalized with dimethylethanolamine showing a much stronger dependence of Mooney viscosity on the level of functionality which makes the polymer very difficult to process.

This invention describes vulcanizable and cured compositions of a triethylamine-functionalized elastomer, articles made from the compositions, and methods of making the articles using the compositions. The triethylamine functionalization can provide an improved barrier property (less permeable) and at the same time can provide improved processability through a mechanism for controlling the viscosity of the elastomer and the composition.

As used herein, "polymer" may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form the monomer. Likewise, when a functionalized polymer is described with reference to the component used to functionalize the polymer or a particular derivative form, it is understood that functionalizing component is present in the form of the functional group actually derived from that component. For example, the product of functionalization of brominated poly(isobutylene-co-p-methylstyrene) (BIMS) with triethylamine may be referred to as triethylamine functionalized BIMS, triethylammonium-BIMS (TEA-BIMS) or a similar expression, it being understood that the pendant functional group may comprise triethylammonium ion, triethylammonium salt, or another derivative.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber."

As used herein, "phr" is 'parts per hundred rubber' and is a measure common in the art wherein components of a composition are measured relative to a major elastomer component, based upon 100 parts by weight of the elastomer(s) or rubber(s).

As used herein, "isobutylene based elastomer" or "isobutylene based polymer" refers to elastomers or polymers comprising at least 70 mole percent repeat units from isobutylene.

As used herein, isoolefin refers to any olefin monomer having at least one carbon having two substitutions on that carbon.

As used herein, "multiolefin" refers to any monomer having two or more double bonds, for example, a multiolefin may be any monomer comprising two conjugated double bonds such as a conjugated diene such as isoprene.

As used herein, "nanocomposite" or "nanocomposite composition" refers to polymer systems containing inorganic particles with at least one dimension in the nanometer range within a polymer matrix.

As used herein, "intercalation" refers to the state of a composition in which a polymer is present between each layer of a platelet filler. As is recognized in the industry and by academia, some indicia of intercalation can be the shifting and/or weakening of detection of X-ray lines as compared to that of original platelet fillers, indicating a larger spacing between vermiculite layers than in the original mineral.

As used herein, "exfoliation" refers to the separation of individual layers of the original inorganic particle, so that polymer can surround or surrounds each particle. In an embodiment, sufficient polymer is present between each platelet such that the platelets are randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc.

As used herein the Mooney viscosity is determined in accordance with ASTM D-1646, ML 1+8 at 125° C., unless otherwise specified.

In an embodiment, the nanocomposite can include at least one triethylamine-functionalized halogenated elastomer comprising $C_4$ to $C_7$ isoolefin derived units. The isoolefin may be a $C_4$ to $C_7$ compound, in one embodiment selected from isobutylene, isobutene, 2-methyl-1-butene, 3-methyl-1-butene, 2-methyl-2-butene, 4-methyl-1-pentene and the like. The elastomer may also include other monomer derived units.

In one embodiment, the halogenated elastomer includes at least one styrenic monomer, which may be any substituted styrene monomer unit, and desirably can be selected from para-alkylstyrenes, wherein the alkyl can be selected from any $C_4$ to $C_5$ alkyl or branched chain alkyl. In a desirable embodiment, the styrenic monomer can be p-methylstyrene (PMS).

In another embodiment, the elastomer can include at least one multiolefin, which may be a $C_4$ to $C_{14}$ diene, conjugated or not, in one embodiment selected from isoprene, butadiene, 2,3-dimethyl-1,3-butadiene, myrcene, 6,6-dimethyl-fulvene, hexadiene, cyclopentadiene, methylcyclopentadiene, piperylene and the like.

The halogenated elastomers in one embodiment of the invention can be random elastomeric copolymers of a $C_4$ to $C_7$ isoolefin, such as isobutylene and a para-alkylstyrene comonomer, preferably p-methylstyrene containing at least 80%, more preferably at least 90% by weight of the para-isomer, and can also include functionalized interpolymers wherein at least some of the alkyl substituents groups present in the styrene monomer units can contain benzylic halogen or triethylammonium, for example, from functionalization with triethylamine via the benzylic halogen. Preferred materials may be characterized as interpolymers containing the following monomer units randomly spaced along the polymer chain:

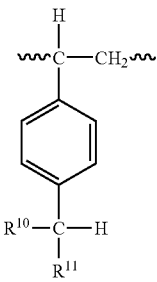

(4)

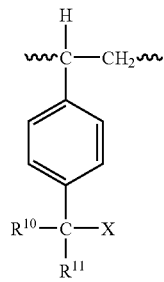

(5)

wherein $R^{10}$ and $R^{11}$ are independently hydrogen, lower alkyl, preferably $C_1$ to $C_7$ alkyl, and primary or secondary alkyl halides; and X is a functional group such as halogen or triethylammonium. Preferably $R^{10}$ and $R^{11}$ are hydrogen. Up to 60 mole percent of the para-substituted styrene present in the interpolymer structure may be the functionalized structure (5) above in one embodiment, and in another embodiment from 0.1 to 5 mole percent. In yet another embodiment, the amount of functionalized structure (5) is from 0.4 to 1 mole percent.

The functional group X may be a combination of a halogen and a triethylammonium functional group which may be incorporated by nucleophilic substitution of benzylic halogen with triethylamine. Most useful of such functionalized materials are elastomeric random interpolymers of isobutylene and para-methylstyrene containing from 0.5 to 20 mole percent para-methylstyrene, wherein up to 60 mole percent of the methyl substituent groups present on the benzyl ring contain a mixture of halogen, e.g. a chlorine or preferably a bromine atom (para-(bromomethylstyrene)), and triethylammonium, and may optionally comprise other functional groups such as ester and ether. The halogenated elastomers are commercially available as EXXPRO™ Elastomers (ExxonMobil Chemical Company, Houston Tex.), and abbreviated as "BIMS" The BIMS can be treated with substoichiometric triethylamine to obtain the partially functionalized triethylamine-BIMS, abbreviated herein as TEA-BIMS.

These functionalized interpolymers can have a substantially homogeneous compositional distribution such that at least 95% by weight of the polymer has a para-alkylstyrene content within 10% of the average para-alkylstyrene content of the polymer. Desirable interpolymers can also be characterized by a narrow molecular weight distribution (Mw/Mn) of less than 5, more preferably less than 2.5, a preferred viscosity average molecular weight in the range of from 200,000 up to 2,000,000, and a preferred number average molecular weight in the range of from 25,000 to 750,000 as determined by gel permeation chromatography.

The TEA-BIMS polymers may be prepared by a slurry polymerization of the monomer mixture using a Lewis acid catalyst, followed by halogenation, preferably bromination, in solution in the presence of halogen and a radical initiator such as heat and/or light and/or a chemical initiator, and followed by electrophilic substitution of bromine with a different functional moiety such as triethylammonium.

Preferred TEA-BIMS polymers generally contain from 0.1 to 5 mole percent of functionalized-methylstyrene groups relative to the total amount of monomer derived units in the polymer. In another embodiment, the total amount of bromomethyl and TEA-methyl groups can be from 0.2 to 3.0 mole percent, from 0.3 to 2.8 mole percent in yet another embodiment, from 0.4 to 2.5 mole percent in yet another embodiment, and from 0.3 to 2.0 in yet another embodiment, wherein a desirable range may be any combination of any upper limit with any lower limit. Expressed another way, preferred copolymers can contain from 0.2 to 10 weight percent of total bromine and TEA, based on the weight of the polymer, from 0.4 to 7 weight percent total bromine and TEA in another embodiment, and from 0.6 to 6 weight percent in another embodiment, and can be substantially free of ring halogen or halogen in the polymer backbone chain.

In various embodiments, the molar ratio of TEA-methyl to bromomethyl in the TEA-BIMS polymer can range from a lower limit of 1100, 1:50, 1:20, or 1:10, to an upper limit of 1:1, 1:2, 1:3, or 1:4, wherein a desirable range may be any combination of any upper limit with any lower limit. The proportion of TEA should be sufficient to improve the barrier property, which usually requires a minimum level of TEA functionality but does not necessarily improve the barrier property at higher proportions of TEA above the minimum or threshold level Above the threshold TEA functionality level, the Mooney viscosity can increase with additional TEA functionality, for example, the Mooney increase can be substantially linear in proportion to the level of TEA functionality. At excessive TEA functionality levels, the Mooney may become too high to compound and process the elastomer, or may require excessive levels of processing aids used to lower the viscosity such as oils, resins, or the like. In one embodiment, the conversion of benzylic bromine to ammonium functionality can be used as a design space variable to target the desired Mooney viscosity of the elastomer and/or a vulcanizable composition prepared using it.

In one embodiment of the invention, the interpolymer is a copolymer of $C_4$ to $C_7$ isoolefin derived units (or isomonoolefin), para-methylstyrene derived units (PMS), para-(bromomethylstyrene) derived units (BrPMS), and para-(triethylammoniummethylstyrene) derived units (TEAPMS), wherein the TEAPMS units are present in the interpolymer from 0.1 to 1.0 mole percent based on the total moles of isoolefin and PMS, BrPMS units are present in the interpolymer from 0.3 to 3.0 mole percent based on the total moles of isoolefin and PMS, and the PMS derived units are present from 3 to 15 weight percent based on the total weight of the polymer in one embodiment, and from 4 weight percent to 10 weight percent in another embodiment.

Optionally, the TEA-BIMS polymer can also be functionalized with an amine in addition to the triethylamine. The other amine functionalization can be at a proportion or degree that the advantages of the viscosity characteristics or the barrier property of the TEA are substantially realized. In embodiments, the other amine functionalized monomer units can comprise a lower limit from 0.001, 0.01 or 0.1 up to an upper limit of 5, 2.1 or 0.5 mole percent, based on the total moles of TEA-functionalized monomer units, wherein a range can be from any lower limit to any upper limit. One embodiment is a nanocomposite comprising a clay and a halogenated elastomer comprising $C_4$ to $C_7$ isoolefin derived units; wherein a first portion of the halogen in the elastomer is electrophilically substituted with TEA and a second portion with an amine functionalized group other than TEA such that the halogenated elastomer also comprises an amine-functionalized monomer unit described by the following group pendant to the elastomer E:

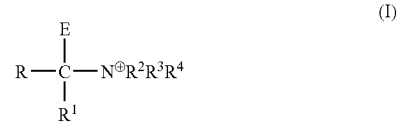

(I)

wherein R and $R^1$ are the same or different and are one of hydrogen, $C_1$ to $C_7$ alkyls, and primary and secondary alkyl halides; and wherein $R^2$, $R^3$ and $R^4$ are the same or different and are selected from the group consisting of hydrogen, substituted or unsubstituted $C_1$ to $C_{20}$ alkenyls, substituted or unsubstituted $C_1$ to $C_{20}$ aryls, $C_1$ to $C_{20}$ aliphatic alcohols, $C_1$ to $C_{20}$ aliphatic ethers, $C_1$ to $C_{20}$ carboxylic acids, nitriles, polyethoxyls, acrylates, and esters, with the proviso that $R^2$, $R^3$ and $R^4$ are not all ethyl.

The acrylate can be described by the following formula:

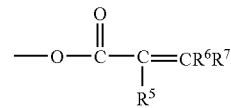

wherein $R^5$, $R^6$ and $R^7$ are the same or different and are selected from hydrogen, $C_1$ to $C_7$ alkyl and $C_1$ to $C_7$ alkenyl. The polyethoxyls can be obtained in one embodiment by functionalization via the benzylic bromine in the BIMS with ethoxylated amines (or the corresponding ammonium ion) having the following structure:

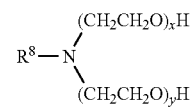

wherein $R^8$ is a $C_1$ to $C_{20}$ alkyl; and wherein x+y is from 2 to 50, e.g., 2, 5, 10, 15, or 50.

The acrylates can be obtained in one embodiment by functionalization via the benzylic bromine in the 131MS with a member selected from dimethylaminoethylacrylate, dimethylaminomethylacrylate, N-methylamino-bis-2-propanol, N-ethylamino-bis-2-propanol, dimethylaminoethylmethacrylate, diethylaminopropanol, diethylethanolamine, dimethylamino-1-propanol, tripropanolamine, triethanolamine, aminolauric acid, betaine, and combinations thereof.

A secondary rubber or "general purpose rubber" component may be present in compositions and end use articles of the present invention. These rubbers can include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (STBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl(polyisobutylene/isoprene copolymer) rubber; poly(isobutylene-co-p-methylstyrene) and halogenated poly (isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component can include natural rubber. Natural rubbers are described in detail by Subramaniam in RUBBER TECHNOLOGY 179-208 (Maurice Morton, Chapman & Hall 1995). Desirable embodiments of the natural rubbers can be selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65.

Polybutadiene rubber (BR) is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN, BUDENE 1207 or BR 1207 (Goodyear Chemical Company). A desirable rubber is high cis-polybutadiene (cis-BR). By "cis-polybutadiene" or "high cis-polybutadiene," it is meant that 1,4-cis-polybutadiene is used, wherein the amount of cis component is at least 95%. An example of a high cis-polybutadiene commercial product used in the composition is BUDENE 1207 cis-BR.

Rubbers of ethylene and propylene derived units such as EPM and EPDM are also suitable as secondary rubbers. Examples of suitable comonomers in making EPDM are ethylidene norbornene, vinyl norbornene, 1,4-hexadiene, dicyclopentadiene, as well as others. These rubbers are described in RUBBER TECHNOLOGY 260-283 (1995). A suitable ethylene-propylene rubber is commercially available as VISTALON™ (ExxonMobil Chemical Company, Houston Tex.).

In another embodiment, the secondary rubber can be a halogenated butyl rubber. The halogenated butyl rubber can be brominated butyl rubber, and in another embodiment can be chlorinated butyl rubber. General properties and processing of halogenated butyl rubbers are described in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component can include, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BIMS), and the like halomethylated aromatic interpolymers as in U.S. Pat. Nos. 5,162,445; 4,074,035; and U.S. Pat. No. 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963.

In one embodiment of the invention, a so called semi-crystalline copolymer ("SCC") can be present as the secondary "rubber" component. Semi-crystalline copolymers are described in WO00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the elastomer composition may be present in a range up to 90 phr in one embodiment, up to 50 phr in another embodiment, up to 40 phr in another embodiment, and up to 30 phr in yet another embodiment. In yet another embodiment, the secondary rubber is present from at least 2 phr, from at least 5 phr in another embodiment, and from at least 10 phr in yet another embodiment. A desirable embodiment may include any combination of any upper phr limit and any lower phr limit.

The composition of the invention may also include one or more filler components such as calcium carbonate, clay, nanoclay, mica, silica and silicates, talc, titanium dioxide, and carbon black.

In one embodiment, the composition can include swellable inorganic clay to form nanocomposites. Swellable layered inorganic clay materials can include natural or synthetic phyllosilicates, particularly smectic clays such as montmorillonite, nontronite, beidellite, volkonsleoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 8-12 Å tightly bound together at interlayer spacings of 4 Å or less, and contain exchangeable cations such as $Na^+$, $Ca^{+2}$, $K^+$ or $Mg^{+2}$ present at the interlayer surfaces.

The layered clay can be exfoliated by suspending the clay in a water solution. Preferably, the concentration of clay in water is sufficiently low to minimize the interaction between clay particles and to fully exfoliate the clay. In one embodiment, the aqueous slurry of clay can have a clay concentration of between 0.1 and 5.0 weight percent; between 0.1 and 3.0 weight percent in other embodiments. Organoclays can be obtained by using an organic exfoliating agent such as, for example, tertiary amines, diamines, polyamines, amine salts, as well as quaternary ammonium compounds. Organoclays are available commercially under the trade designation CLOISITE, for example.

The amount of clay or exfoliated clay incorporated in the nanocomposites in accordance with this invention is sufficient to develop an improvement in the mechanical properties or barrier properties of the nanocomposite for example, tensile strength or oxygen permeability. Amounts of clay in the nanocomposite generally range from 0.5 to 10 weight percent in one embodiment, and from 1 to 5 weight percent in another embodiment, based on the polymer content of the nanocomposite. Expressed in parts per hundred rubber, the clay or exfoliated clay may be present from 1 to 30 phr in one embodiment, from 2 to 20 phr in another embodiment, and from 3 to 10 phr in another embodiment.

The TEA-BIMS-nanoclay nanocomposites can generally be prepared using a variety of processes, such as solution blending, melt blending, or an emulsion process. For example, PCT Application Ser. No. PCT/US/22714 discloses melt blending procedures; published application US 2007-0015853 discloses a method for preparing clay-butyl rubber nanocomposites from an emulsion of rubber solution and aqueous clay dispersion; and U.S. application Ser. No. 11/183,361 for Split-Stream Process for Making Nanocomposites by W. Weng et al., filed Jul. 18, 2005, discloses a method for preparing clay-butyl rubber nanocomposites by preparing a concentrated nanocomposite from a slipstream of the rubber and blending the concentrate with a main rubber stream.

As used herein, fillers can include inorganic particles forming part of the nanocomposite matrix, e.g. clay particles having a dimension in the nanometer range, and larger clay particles can also be used as an additional filler in the nanocomposites, if desired.

In one embodiment, the filler can include carbon black or modified carbon black. The preferred filler is semi-reinforcing grade carbon black present at a level of from 10 to 150 phr of the blend, more preferably from 30 to 120 phr. Useful grades of carbon black as described in RUBBER TECHNOLOGY 59-85 (1995) range from N110 to N990. More desirably, embodiments of the carbon black useful in for example, tire treads are N229, N351, N339, N220. N234 and N, 110 provided in ASTM (D3037, D1510, and D3765). Embodiments of the carbon black useful in, for example, sidewalls in tires, are N330, N351, N550, N650, N660, and N762. Embodiments of the carbon black useful in, for example, innerliners for tires are N550, N650, N660, N762, and N990.

The composition can include curative systems which are capable of curing the functionalized elastomeric copolymer component to provide vulcanizable compositions. Suitable curative systems can include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5 triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD (diphenyl phenylene diamine), salicyclic acid (o-hydroxy benzoic acid), wood rosin (abietic acid), and TMTDS (tetramethyl thiuram disulfide) in combination with sulfur.

The compositions of the invention may also contain other conventional additives such as dyes, pigments antioxidants heat and light stabilizers, plasticizers, oils and other ingredients as known in the art.

Blending of the fillers, additives, and/or curative components may be carried out by combining the desired components and the nanocomposite of the present invention in any suitable mixing device such as a BANBURY mixer, BRABENDER mixer or preferably a mixer/extruder and mixing at temperatures in the range of 120° C. up to 300° C. under conditions of shear sufficient to allow the components to become uniformly dispersed within the polymer to form the nanocomposite.

The compositions can be extruded, compression molded, blow molded or injection molded into various shaped articles including fibers, films, industrial parts such as automotive parts, appliance housings, consumer products, packaging and the like. The resulting articles can exhibit both high impact strength and low vapor permeability. In particular, the composition described herein is useful for air barriers such as bladders, and automotive (including truck, commercial and/or passenger) or aircraft innerliners and inner tubes.

The invention, accordingly, provides the following embodiments:

A. A vulcanizable rubber composition, comprising an elastomer comprising $C_4$ to $C_7$ isoolefin derived units, para-alkylstyrene derived units, para-(haloalkylstyrene) derived units and para-(triethylammoniumalkylstyrene) derived units having the triethylammoniumalkyl group pendant to the elastomer E according to formula (1) above wherein R and $R^1$ are the same or different and are one of hydrogen, $C_1$ to $C_7$ alkyls, and primary and secondary $C_1$ to $C_7$ alkyl halides; a filler; and a cure package;

B. The composition of embodiment A wherein the elastomer comprises halogenated poly(isobutylene-co-p-methylstyrene) wherein a portion of the benzylic halogen groups are triethylamine-functionalized;

C. The composition of embodiment A or B wherein the elastomer comprises a molar ratio of triethylamine functionality to benzylic halogen from 1:100 to 1:1;

D. The composition of any preceding embodiment A-C wherein the elastomer comprises a molar ratio of triethylamine functionality to benzylic halogen from 1:20 to 1:2;

E. The composition of any preceding embodiment A-D wherein from 1 to 60 mole percent of the methylstyrene groups are halogenated or triethylamine-functionalized;

F. The composition of any preceding embodiment A-E wherein the elastomer comprises from 0.1 to 3 mole percent halomethylstyrene and from 0.05 to 1 mole percent triethylammonimmethylstyrene;

G. The composition of any preceding embodiment A-F wherein the para-(triethylammoniumalkylstyrene) derived units are present at from 0.01 to 0.5 percent by weight of the elastomer;

H. The composition of any preceding embodiment A-G wherein the filler is selected from carbon black, modified carbon black, silica, precipitated silica, clay, nanoclay and mixtures thereof;

I. The composition of any preceding embodiment A-H wherein the filler is an exfoliated nano-clay;

J. The composition of any preceding embodiment A-I wherein the elastomer comprises a Mooney viscosity (ML 1+8, 125° C.) from 30 to 120;

K. An elastomer comprising $C_4$ to $C_7$ isoolefin derived units, para-alkylstyrene derived units, para-(haloalkylstyrene) derived units and para-(triethylammoniumalkylstyrene) derived units having the triethylammoniumalkyl group pendant to the elastomer E according to formula (I) above wherein R and $R^1$ are the same or different and are one of hydrogen, $C_1$ to $C_7$ alkyls, and primary and secondary $C_1$ to $C_7$ alkyl halides, the elastomer having a Mooney viscosity (ML 1+8, 125° C.) from 30 to 120;

L. The elastomer of embodiment K wherein the elastomer comprises halogenated poly(isobutylene-co-p-methylstyrene) wherein a portion of the benzylic halogen groups are triethylamine-functionalized;

M. The elastomer of embodiment K or L wherein the elastomer comprises a molar ratio of triethylamine functionality to benzylic halogen from 1:100 to 1:1;

N. The elastomer of any preceding embodiment K-M wherein the elastomer comprises a molar ratio of triethylamine functionality to benzylic halogen from 1:20 to 1:2;

O. The elastomer of any preceding embodiment K-N wherein from 1 to 60 mole percent of the methylstyrene groups are halogenated or triethylamine-functionalized;

P. The elastomer of any preceding embodiment K-O wherein the elastomer comprises from 0.1 to 3 mole percent halomethylstyrene and from 0.05 to 1 mole percent triethylammoniummethylstyrene;

Q. The elastomer of any preceding embodiment K-P wherein the para(triethylammoniumalkylstyrene) derived units are present at from 0.01 to 0.5 percent by weight of the elastomer;

R. An article comprising the elastomer of any preceding embodiment K-Q in an air impermeable layer of the article;

S. A tire innerliner comprising the vulcanizable rubber composition according to any preceding embodiment A-J;

T. A method of preparing an elastomeric article, comprising: (1) melt processing a mixture of partially ionomerized, partially halogenated elastomer, filler and cure package; (2) forming the melt processed mixture into a green article, and (3) curing the formed article, wherein the elastomer comprises $C_4$ to $C_7$ isoolefin derived units, para-alkylstyrene derived units, para-(haloalkylstyrene) derived units and para-(trialkylammoniumalkylstyrene) derived units having the triethylaminoalkyl group pendant to the elastomer E according to formula (I) above wherein R and $R^1$ are the same or different and are one of hydrogen, $C_1$ to $C_7$ alkyls, and primary and secondary $C_1$ to $C_7$ alkyl halides and has a Mooney viscosity (ML 1+8, 125° C.) from 30 to 120;

U. The method of embodiment T wherein the elastomer comprises halogenated poly(isobutylene-co-p-methylstyrene) wherein a portion of the benzylic halogen groups are triethylamine-functionalized;

V. The method of embodiment T or U wherein the elastomer comprises a molar ratio of triethylamine functionality to benzylic halogen from 1:100 to 1:1:

W. The method of any preceding embodiment T-V wherein the elastomer comprises a molar ratio of triethylamine functionality to benzylic halogen from 1:20 to 1:2;

X. The method of any preceding embodiment T-W wherein from 1 to 60 mole percent of the methylstyrene groups are halogenated or triethylamine-functionalized;

Y. The method of any preceding embodiment T-X wherein the elastomer comprises from 0.5 to 20 weight percent methylstyrene;

Z. The method of any preceding embodiment T-Y wherein the elastomer comprises from 0.1 to 3 mole percent halomethylstyrene and from 0.05 to 1 mole percent triethylammoniummethylstyrene;

AA. The method of any preceding embodiment T-Z wherein the elastomer further comprises multiolefin derived units, halogenated multiolefin derived units, or a combination thereof;

BB. The method of any preceding embodiment T-AA wherein the mixture in the melt processing further comprises a secondary rubber selected from the group consisting of natural rubber, polybutadiene rubber, nitrite rubber, silicon rubber, polyisoprene rubber, poly(styrene-co-butadiene) rubber, poly(isoprene-co-butadiene) rubber, styrene-isoprene-butadiene rubber, ethylene-propylene rubber brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber, poly (isobutylene-co-p-methylstyrene), halogenated poly (isobutylene-co-p-methylstyrene) and mixtures thereof;

CC. The method of any preceding embodiment T-BB wherein the para-(triethylammoniumalkylstyrene) derived units are present at from 0.01 to 0.5 percent by weight of the elastomer;

DD. The method of any preceding embodiment T-CC wherein the filler is selected from carbon black, modified carbon black, silica precipitated silica, clay, nanoclay and mixtures thereof;

EE. The method of any preceding embodiment T-DD wherein the filler comprises nanoclays;

FF. The method of embodiment EE wherein the nanoclay is exfoliated;

GG. The method of embodiment FF wherein the nanoclay is exfoliated with an exfoliating agent selected from the group consisting of ammonium ion, alkylamines, alkylammonium ion (primary, secondary, tertiary and quaternary), phosphonium or sulfonium derivatives of aliphatic, aromatic and arylaliphatic amines, phosphines, sulfides and mixtures thereof;

HH. The method of any preceding embodiment EE-GG comprising from 1 to 100 phr of the nanoclays;

II. The method of any preceding embodiment T-HH wherein the curing agents comprise zinc, zinc stearate, fatty acids, sulfur, or a mixture thereof;

JJ. The method of any preceding embodiment T-II wherein the article comprises an inner tube;

KK. The method of any preceding embodiment T-JJ wherein the article comprises a tire wherein the green article comprises a tire innerliner formed from the elastomer mixture;

LL. The method of any preceding embodiment T-KK comprising adjusting an overall content of the para-(triethylammoniumalkylstyrene) in the elastomer to control a viscosity of the mixture in the melt processing.

EXAMPLES

The following non-limiting examples are illustrative of the present invention.

Example 1

Comparative—100-TEA-BIMS

Fifty grams of EXXPRO™ brominated isobutylene-para-methylstyrene copolymer (BIMS) (MDX 03-1: 10 wt % para-methylstyrene (PMS), 0.85 mol % BrPMS, Mooney 31.5) were dissolved in 500 mL of toluene in a 1-L reactor. Triethylamine (TEA) (4.38 g) was dissolved in 150 mL of isopropyl alcohol and added to the reactor. The reaction mixture was heated to 85-86° C. and refluxed for 6 hours. The product was precipitated by adding 1000 mL of isopropyl alcohol to the polymer cement. After drying in a vacuum oven at 80° C. for 16 hours, the $^1$H NMR analysis of the precipitate showed complete or substantially 100% conversion of benzylic bromide to ammonium functionality in the resulting functional polymer (100-TEA-BIMS).

Example 2

36-TEA-BIMS

One hundred grams of EXXPRO™ BIMS polymer (MDX 03-1: 10 wt % of PMS, 0.85 mol % BrPMS, Mooney 31.5) were dissolved in 750 mL of toluene in a 2-L reactor. TEA (1.46 g) was dissolved in 150 mL of isopropyl alcohol and added to the reactor. The reaction mixture was heated to 85-86° C. and refluxed for 6 hours. The product was precipitated by adding 1000 mL of isopropyl alcohol to the polymer cement. After drying in a vacuum oven at 80° C. for 16 hours, the $^1$H NMR analysis of the precipitate showed 36.5% conversion of benzylic bromide to ammonium in the resulting functional polymer (36-TEA-BIMS).

Example 3

21-TEA-BIMS

One hundred grams of EXXPRO™ BIMS polymer (MDX 03-1: 10 wt % of PMS, 0.85 mol % BrPMS, Mooney 31,5) were dissolved in 750 mL of toluene in a 2-L reactor. TEA (0.73 g) was dissolved in 150 mL of isopropyl alcohol and added to the reactor. The reaction mixture was heated to 85-86° C. and refluxed for 6 hours. The product was precipitated by adding 1000 mL of isopropyl alcohol to the polymer cement. After drying in a vacuum oven at 80° C. for 16 hours, the $^1$H NMR analysis of the precipitate showed 21.2% conversion of benzylic bromide to ammonium in the resulting functional polymer (21-TEA-RIMS).

Example 4

9-TEA-BIMS

One hundred grams of EXXPRO™ BIMS polymer (MDX 03-1: 10 wt % of PMS, 0.85 mol % BrPMS, Mooney 31.5) were dissolved in 750 mL of toluene in a 2-L reactor. TEA (0.37 g) was dissolved in 150 mL of isopropyl alcohol and added to the reactor. The reaction mixture was heated to 85-86° C. and refluxed for 6 hours. The product was precipitated by adding 1000 mL of isopropyl alcohol to the polymer cement. After drying in a vacuum oven at 80° C. for 16 hours, the $^1$H NMR analysis of the precipitate showed 9.4% conversion of benzylic bromide to ammonium functionality in the resulting functional polymer (9-TEA-RIMS).

Example 5

6-TEA-BIMS

One hundred grams of EXXPRO™ BIMS polymer (10 wt % PMS, 0.85 mol % BrPMS, Mooney 31.5) were dissolved in 750 mL of toluene in a 2-1 reactor. Triethylamine (0.18 g) was dissolved in 150 mL of isopropyl alcohol and added to the reactor. The reaction mixture was heated to 85-86° C. and refluxed for 6 hours. The product was precipitated by adding 1000 mL of isopropyl alcohol to the polymer cement. After drying in a vacuum oven at 80° C. for 16 hours, the $^1$H NMR analysis of the precipitate showed 5.9% conversion of benzylic bromide to ammonium in the resulting functional polymer (6-TEA-BIMS).

Example 6

Mooney Viscosity Measurements

Mooney viscosity (ML 1+8, 125° C.) of the functional polymers in Examples 1 through 5 was measured according to ASTM 1646 Method. The results are tabulated in Table 1.

TABLE 1

Viscosity of TEA-BIMS Polymers

| Polymer | BrPMS Conversion (%) | Mooney (ML 1 + 8, 125° C.) |
|---|---|---|
| EXXPRO BIMS | 0 | 31.5 |
| 6-TEA-BIMS | 5.9 | 38.5 |

TABLE 1-continued

Viscosity of TEA-BIMS Polymers

| Polymer | BrPMS Conversion (%) | Mooney (ML 1 + 8, 125° C.) |
|---|---|---|
| 9-TEA-BIMS | 9.4 | 49.9 |
| 21-TEA-BIMS | 21.2 | 88.2 |
| 36-TEA-BIMS | 36.5 | 111.8 |
| 100-TEA-BIMS | 100 | ND |

ND = Not determined.

The tabulated results shown in FIG. 1 indicate a substantially linear relationship between the degree of TEA functionalization (BrPMS conversion) and the Mooney viscosity, which can be used to obtain a target effective molecular weight for compounding purposes. In contrast, FIG. 1 also shows that in BIMS functionalized with dimethyl ethanol amine, which has two smaller methyl groups replacing the ethyl groups from TEA, the Mooney viscosity increases too rapidly with the level of functionality, and the processability of the polymer is too difficult to control.

Example 7

MOCON Permeability Measurement

Functional TEA-BIMS polymers were mixed with carbon black and curatives in the following proportions:

TABLE 2

Elastomer Formulations for Permeability

| Designation | Material/Source | PHR |
|---|---|---|
| TEA-BIMS | Examples 2-5 | 100 |
| N660 | Carbon Black, Cabot Corp. (Billerica, MA) | 60 |
| Stearic Acid | C. K. Witco Corp. (Taft, LA) | 1 |
| Kadox 911 | ZnO, C. P. Hall (Chicago, IL) | 1 |
| MBTS | 2-Mercaptobenzothiazole disulfide, R. T. Vanderbilt (Norwalk, CT) or Elastochem (Chardon, OH) | 1 |

The TEA-BIMS polymer was loaded into a BRABENDER mixer at a temperature of 130-145° C. and mixed with the carbon black (N660) for 7 minutes. The mixture was further mixed with the curatives package (stearic acid, Kadox 911, and MBTS) at 40° C. and 40 rpm for 3 minutes. The resulting rubber compounds were milled, compression molded and cured at 170° C. All specimens were compression molded with slow cooling to provide defect-free pads. A compression and curing, press was used for rubber samples. Typical thickness of a compression molded pad was around 0.38 mm (15 mil). Using an Arbor press, 5 cm (2-in.) diameter disks were punched out from molded pads for permeability testing. These disks were conditioned in a vacuum oven at 60° C. overnight prior to the measurement. Disks were tested for oxygen permeation measurements were performed on using a MOCON OX-TRAM 2/61 permeability tester at 40° C. with nitrogen on one side of the disk at 0.07 MPa(g) (10 psig) and 0.07 MPa(g) (10 psig) oxygen on the other. The time required for oxygen to permeate through the disk, or for oxygen concentration on the nitrogen side to reach a constant value, was recorded and used to determine the oxygen permeability. Where two samples were prepared using the same procedure, permeation rate results are given in Table 3 for each sample.

TABLE 3

Permeability of TEA-BIMS/Carbon Black Formulations

| Elastomer Formulation | Permeation Rate (mm · cc/m2 · day, 40° C.) | Permeation Rate (mm · cc/m2 · day, 40° C.) |
|---|---|---|
| 36-TEA-BIMS (Example 2) | 108.36 | 104.46 |
| 21-TEA-BIMS (Example 3) | 107.63 | 110.64 |
| 9-TEA-BIMS (Example 4) | 107.80 | 106.08 |
| 6-TEA-BIMS (Example 5) | 108.31 | 106.00 |

These results show that the oxygen permeability of TEA-BIMS elastomers formulated with filler such as carbon black was low over the range of TEA functionality tested, from 6 to 36% BrPMS conversion. The oxygen permeability does not seem to be substantially dependent on the degree of TEA functionality.

Example 8

19-TEA-BIMS in an Innerliner Formulation

One hundred fifty grams of EXXPRO™ BIMS polymer (10 wt % of PMS, 0.85 mol % BrPMS, Mooney 31.5) were dissolved in 1200 mL of toluene in a 2-L reactor. TEA (1.31 g) was dissolved in 200 mL of isopropyl alcohol and added to the reactor. The reaction mixture was heated to 85-86° C. and refluxed for 6 hours. The product was precipitated by adding 1000 mL of isopropyl alcohol to the polymer cement. After drying in a vacuum oven at 80° C. for 16 hours, the $^1$H NMR analysis of the precipitate showed 18.8% conversion of benzylic bromide to ammonium functionality in the resulting functional polymer (19-TEA-BIMS).

The 19-TEA-BIMS and unmodified BIMS elastomer were formulated with carbon black and with and without an organoclay according to the recipe in Table 4.

TABLE 4

Nanocomposite/Elastomer Formulations for Property Evaluation

| Designation | Material/Source | PHR |
|---|---|---|
| EXXPRO BIMS | 10 wt % PMS, 0.85 mol % BrPMS, Mooney 31.5; | 100.0 |
| 19-TEA-BIMS | Example 8 | |
| N772 | Carbon Black, Sid Richardson Carbon Co. or another supplier | 51.0 |
| CLOISITE 20A | Montmorillonite modified with dimethyl-dihydrogenated tallow ammonium chloride, Southern Clay Products, Inc. | 7.8 |
| Tackifier | Phenolic tackifier resin, SI Group, HRJ-2765 or another supplier | 2.5 |
| Stearic Acid | C. K. Witco Corp. or another supplier | 1.5 |
| Curatives | Sulfur, ZnO and Accelerator | 4.2 |

The BIMS or TEA-BIMS polymer was loaded into a BANBURY mixer and premasticated for 30 seconds with a rotor speed of 40 RPM at a temperature of 60° C. Next, the rotor speed was increased to 60 RPM and the carbon black (N772) and organoclay (CLOISITE 20A) were added. At 100° C. the tackifier resin and the stearic acid were added and mixing continued until the temperature reached 145° C. The mixture was placed onto a cool mill where the curatives were added. Samples for permeability measurements were further calendered to a thickness of 1.0 mm and then compression molded and cured at 150° C. The oxygen transmission rate (permeability) was measured on a MOCON 2/61 at 40° C. as described above, and samples evaluated for 10% and 100% modulus, and elongation at break. The results are given in Table 5.

Moduli of elongation were measured at 10% and 100% elongation at a temperature of 23° C. in accordance with ASTM D412 on ASTM C test pieces. These measurements are true secant moduli, that is to say the secant moduli were calculated based on the actual cross-sectional area of the test piece at the given elongation.

The elongation property was measured as elongation at break (%), which is measured at 23° C. in accordance with ASTM D412 on ASTM C test pieces.

TABLE 5

Permeability and Properties of 19-TEA-BIMS/BIMS Formulations with and without Nanoclay

| Component or Property | BIMS Elastomer | 19-TEA-BIMS Elastomer | BIMS Nanocomposite | 19-TEA-BIMS Nanocomposite |
|---|---|---|---|---|
| BIMS, phr | 100 | | 100 | |
| 19-TEA-BIMS, phr | | 100 | | 100 |
| Organoclay, phr | | | 7.8 | 7.8 |
| Mooney (ML 1 + 4, 100° C.) | 82 | 84 | 45 | 77 |
| Modulus @ 10% (23° C.), MPa | 2.9 | 2.6 | 3.7 | 4.0 |
| Modulus @ 100% (23° C.), MPa | 1.37 | 1.16 | 1.40 | 1.72 |
| Elongation at Break (23° C.), % | 558 | 670 | 611 | 593 |
| Permeation Rate (40° C.), mm · cc/m2 · day | 125 | 108 | 105 | 79 |
| Permeability change, % | — | −13.6 | −16.0 | −36.8 |

As shown in Table 5, in an innerliner formulation the TEA functionalized polymer 19-TEA-BIMS yielded a 13.6% permeability improvement (reduction) in the formulation without organoclay compared to the unmodified BIMS. Additionally, when the 19-TEA-BIMS was used with CLOISITE 20A organoclay, the nanocomposite yielded a further permeability reduction. Surprisingly, both the uncured processability properties and the cured physical properties were suitable for a tire innerliner.

The nanocomposites were also examined by x-ray diffraction at room temperature using a Scintag XDS-2000 theta-theta diffraction system, with a sealed Cu X-ray tube and a Germanium detector. The radiation was Cu Kalpha-1 (1.54056 angstroms) with Cu—K radiation generated at 40 mA and 50 kV. Diffraction spectra were obtained over a 2θ range of 2° to 10° in steps of 0.02° and a counting time of 3 seconds at each angular position.

Figure 2:
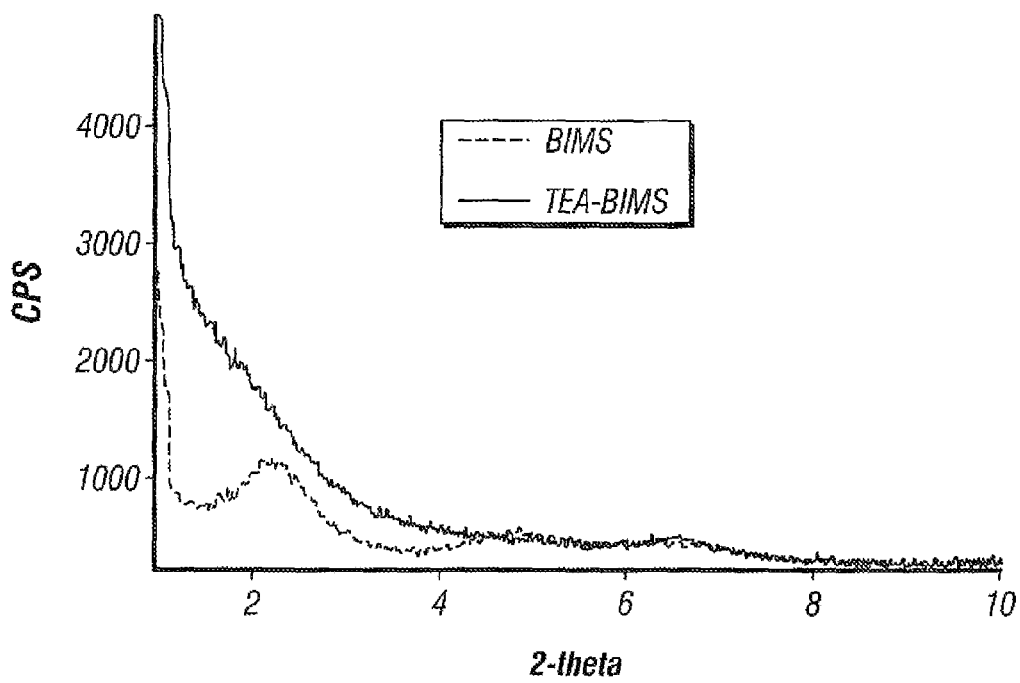
FIG. 2 compares the X-ray diffraction spectra of a nanocomposite of brominated isobutylene-p-methylstyrene copolymer (BIMS) and a triethylamine-functionalized BIMS polymer (TEA-BIMS), showing the enhanced d-spacing, i.e. a larger spacing between clay sheets and indicating a higher degree of intercalation and/or exfoliation in the TEA-BIMS nanocomposite.

FIG. 2 compares the X-ray diffraction spectra of the BIMS/CLOISITE 20A nanocomposite with the nanocomposite with 19-TEA-BIMS. In general, a reduction in the peak intensity indicates a more random or dispersed orientation of the clay particles. The 19-TEA-BIMS nanocomposite had enhanced d-spacing, i.e. a larger spacing between clay sheets, indicating a higher degree of intercalation and/or exfoliation in the TEA-BIMS nanocomposite.

Figure 3:
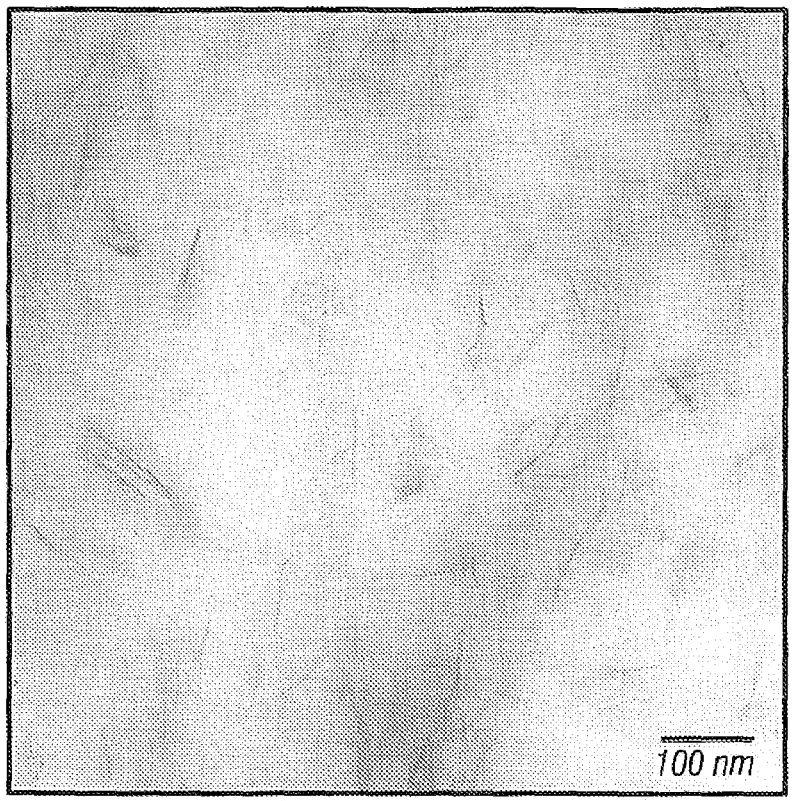
FIG. 3 is a transmission electron microscopy (TEM) image of the TEA BIMS nanocomposite of FIG. 2 showing a high degree of clay exfoliation according to an embodiment of the invention.
Figure 4:
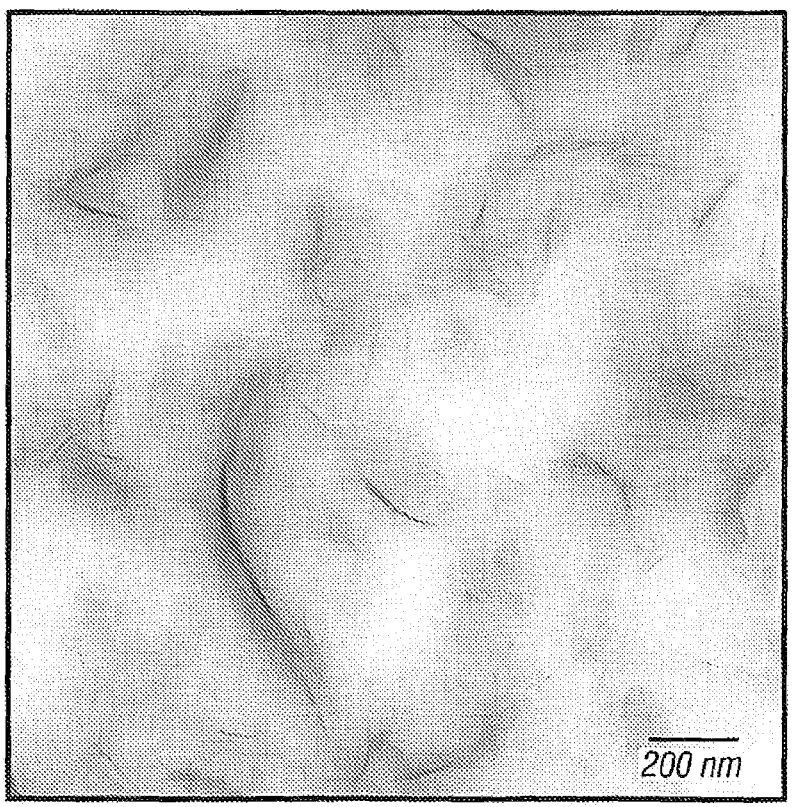
FIG. 4 is a TEM image of the BIMS nanocomposite of FIG. 2 for a comparison and showing large tactoids of unseparated clay sheets.

Similarly, FIGS. 3 and 4 are transmission electron microscopy (TEM) images of the 19-TEA-BIMS nanocomposite and the BIMS nanocomposite, respectively. The 19-TEA-BIMS nanocomposite TEM image (FIG. 3) shows a high degree of clay exfoliation, whereas the BIMS nanocomposite TEM image (FIG. 4) shows large tactoids of unseparated clay sheets.

Embodiments of the final nanocomposite of the present invention are useful as air barriers, such as used in producing innerliners for motor vehicles. In particular, the nanocomposites are useful in innerliners and inner tubes for articles such as truck tires, bus tires, passenger automobile, motorcycle tires, and the like.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

We claim:

1. A vulcanizable rubber composition, comprising:
    an elastomer comprising $C_4$ to $C_7$ isoolefin derived units, para-alkylstyrene derived units, para-(haloalkylstyrene) derived units and para-(triethylammoniumalkylstyrene) derived units having the triethylammoniumalkyl group pendant to the elastomer E according to the following formula:

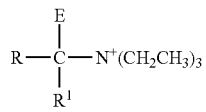

wherein R and $R^1$ are the same or different and are one of hydrogen, $C_1$ to $C_7$ alkyls, and primary and secondary $C_1$ to $C_7$ alkyl halides, and wherein the elastomer comprises a Mooney viscosity (ML1+8, 125° C.) from 30 to 120;
    a filler; and
    a cure package.

2. The vulcanizable rubber composition of claim 1 wherein the elastomer comprises a molar ratio of triethylamine functionality to benzylic halogen from 1:100 to 1:1.

3. The vulcanizable rubber composition of claim 1, wherein the para-(triethylammoniumalkylstyrene) derived units are present at from 0.01 to 0.5 percent by weight of the elastomer.

4. The vulcanizable rubber composition of claim 1, wherein the filler is an exfoliated nano-clay.

5. The vulcanizable rubber composition of claim 1 wherein the Mooney viscosity of the elastomer is no greater than a Mooney viscosity calculated according to the equation $MV_{max}=MV_0+315(X_{TEA})$, wherein $MV_{max}$ is the upper limit of the elastomer Mooney viscosity, $MV_0$ is the Mooney viscosity of a corresponding base elastomer without any triethylammoniumalkyl groups, and $X_{TEA}$ is the mole percent of the para-(triethylammoniumalkylstyrene) derived units in the elastomer, wherein $X_{TEA}$ is from 0 to 0.31 mole percent.

6. An elastomer comprising:
    $C_4$ to $C_7$ isoolefin derived units, para-alkylstyrene derived units, para-(haloalkylstyrene) derived units and para-(triethylammoniumalkylstyrene) derived units having the triethylammoniumalkyl group pendant to the elastomer E according to the following formula:

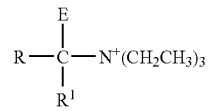

wherein R and R1 are the same or different and are one of hydrogen, $C_1$ to $C_7$ alkyls, and primary and secondary $C_1$ to $C_7$ alkyl halides, the elastomer having a Mooney viscosity (ML1+8, 125° C.) from 30 to 120.

7. The elastomer of claim 6 wherein the elastomer comprises a molar ratio of triethylamine functionality to benzylic halogen from 1:100 to 1:1.

8. The elastomer of claim 6 wherein the elastomer comprises a molar ratio of triethylamine functionality to benzylic halogen from 1:20 to 1:2.

9. The elastomer of claim 6, wherein the para-(triethylammoniumalkylstyrene) derived units are present at from 0.01 to 0.5 percent by weight of the elastomer.

10. An article comprising the elastomer of claim 6 in an air impermeable layer of the article.

11. A tire innerliner, the tire innerliner comprising a vulcanizable rubber composition, the rubber composition comprising:
    an elastomer comprising $C_4$ to $C_7$ isoolefin derived units, para-alkylstyrene derived units, para-(haloalkylstyrene) derived units and para-(triethylammoniumalkylstyrene) derived units having the triethylammoniumalkyl group pendant to the elastomer E according to the following formula:

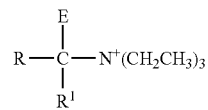

wherein R and $R^1$ are the same or different and are one of hydrogen, $C_1$ to $C_7$ alkyls, and primary and secondary $C_1$ to $C_7$ alkyl halides, and wherein the elastomer comprises a Mooney viscosity (ML 1+8, 125° C.) from 30 to 120;
    a filler; and
    a cure package.

12. The innerliner of claim 11 wherein the elastomer comprises a molar ratio of triethylamine functionality to benzylic halogen from 1:100 to 1:1.

13. The innerliner of claim 11, wherein the filler is an exfoliated nano-clay.

14. A method of preparing an elastomeric article, comprising:
    melt processing a mixture of partially ionomerized, partially halogenated elastomer, filler and cure package;
    forming the melt processed mixture into a green article; and
    curing the formed article;
    wherein the elastomer comprises $C_4$ to $C_7$ isoolefin derived units, para-alkylstyrene derived units, para-(haloalkylstyrene) derived units and para-(trialkylammoniumalkylstyrene) derived units having the triethylammoniumalkyl group pendant to the elastomer E according to the following formula:

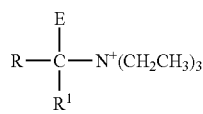

wherein R and $R^1$ are the same or different and are one of hydrogen, $C_1$ to $C_7$ alkyls, and primary and secondary $C_1$ to $C_7$ alkyl halides and has a Mooney viscosity (ML1+8, 125° C.) from 30 to 120.

15. The method of claim 14 wherein the elastomer comprises a molar ratio of triethylamine functionality to benzylic halogen from 1:100 to 1:1.

16. The method of claim 14, wherein the mixture in the melt processing further comprises a secondary rubber selected from the group consisting of natural rubber, polybutadiene rubber, nitrile rubber, silicon rubber, polyisoprene rubber, poly(styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber, poly(isobutylene-co-p-methylstyrene), halogenated poly(isobutylene-co-p-methylstyrene) and mixtures thereof.

17. The method of claim 14, wherein the para-(triethylammoniumalkylstyrene) derived units are present at from 0.01 to 0.5 percent by weight of the elastomer.

18. The method of claim 14, wherein the filler comprises nanoclay.

19. The method of claim 18, wherein the nanoclay is exfoliated.

20. The method of claim 18, wherein the nanoclay is exfoliated with an exfoliating agent selected from the group consisting of ammonium ion, alkylamines, alkylammonium ion (primary, secondary, tertiary and quaternary), phosphonium or sulfonium derivatives of aliphatic, aromatic and arylaliphatic amines, phosphines, sulfides and mixtures thereof.

21. The method of claim 14 wherein the article comprises a tire wherein the green article comprises a tire innerliner formed from the elastomer mixture.

22. The tire innerliner of claim 11, wherein the Mooney viscosity of the elastomer is no greater than a Mooney viscosity calculated according to the equation $MV_{max}=MV_0+315\ (X_{TEA})$, wherein $MV_{max}$ is the upper limit of the elastomer Mooney viscosity, $MV_0$ is the Mooney viscosity of a corresponding base elastomer without any triethylammoniumalkyl groups, and $X_{TEA}$ is the mole percent of the para-(triethylammoniumalkylstyrene) derived units in the elastomer, wherein $X_{TEA}$ is from 0 to 0.31 mole percent.

23. The method of claim 14, wherein the Mooney viscosity of the elastomer is no greater than a Mooney viscosity calculated according to the equation $MV_{max}=MV_0+315\ (X_{TEA})$, wherein $MV_{max}$ is the upper limit of the elastomer Mooney viscosity, $MV_0$ is the Mooney viscosity of a corresponding base elastomer without any triethylammoniumalkyl groups, and $X_{TEA}$ is the mole percent of the para-(triethylammoniumalkylstyrene) derived units in the elastomer, wherein $X_{TEA}$ is from 0 to 0.31 mole percent.

* * * * *